April 8, 1958  J. H. JACOBS  2,830,131
SOUND FILM RECORDING SYSTEM
Filed Oct. 4, 1955
FIG. 1
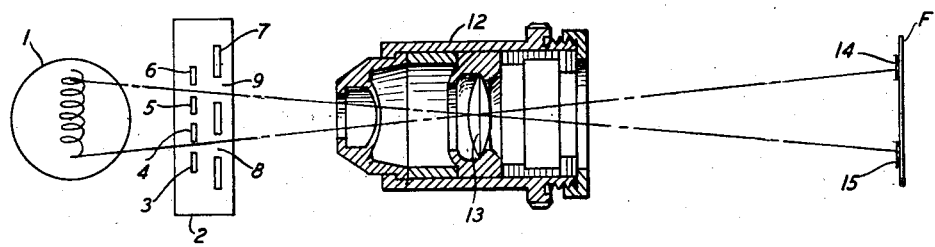
FIG. 2  FIG. 4
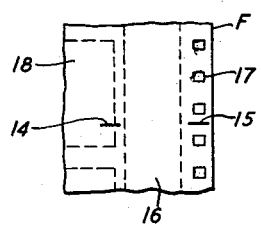 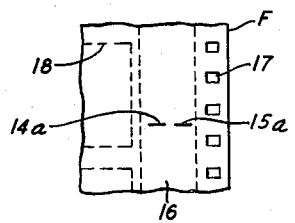
FIG. 3
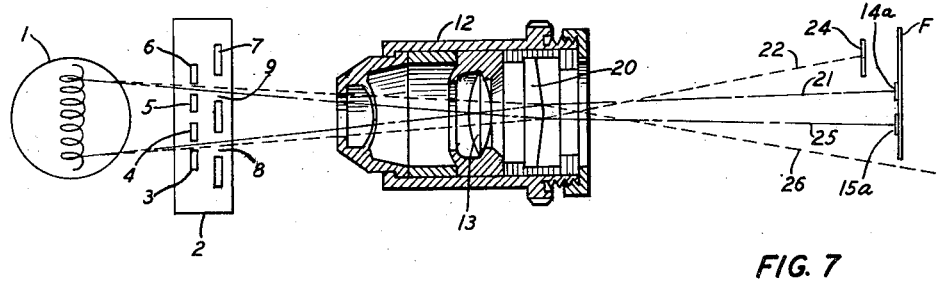
FIG. 7
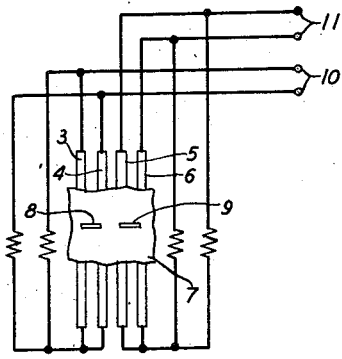
FIG. 5  FIG. 6
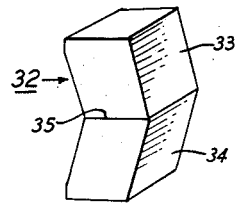
INVENTOR
J. H. JACOBS
BY
J. F. McEneany
ATTORNEY United States Patent Office 2,830,131
Patented Apr. 8, 1958

2,830,131

SOUND FILM RECORDING SYSTEM

John H. Jacobs, Pacoima, Calif., assignor to Westrex Corporation, New York, N. Y., a corporation of Delaware Application October 4, 1955, Serial No. 538,403

7 Claims. (Cl. 179—100.3)

This invention relates to multitrack photographic sound recording and particularly to novel improvements permitting the recording of two sound tracks in the lateral film area normally occupied by the present standard single sound track.

It is the object of this invention to accomplish the recording of a pair of variable area sound tracks in the present single sound track area with a minimum modification of the recording optical system of an existing recording apparatus.

With the introduction of a stereophonic sound reproduction to accompany wide screen motion pictures, it has been found advantageous to record on the negative release photographic sound picture film two stereophonically related sound tracks in the lateral film area formerly occupied by a single sound track. A release print of the stereophonic sound track thus obtained may be reproduced in a theatre having a stereophonic installation including several reproducing channels and associated loudspeakers or it may be reproduced in a theatre not equipped for stereophonic sound reproduction. In the latter case, the sound track is reproduced as a single sound track by an existing standard reproducing optical system.

In a recording system for obtaining the negative sound film from which the theatre release positive film is obtained by a photographic printing step, each of two separate light beams is modulated by a separate one of the stereophonically related sources of sound and these light beams are focused at the plane of the recording film. Where a light valve is used as the light modulating unit, it is provided with two separate sets of signal responsive ribbons. To obtain an arrangement of ribbons in a light valve unit as described, the recording light beams modulated by the ribbons are of necessity separated laterally with respect to the film and are, therefore, too far apart to be focused by an existing conventional lens system on the film in their correct relative position, that is, with the inner edge of one beam adjacent the inner edge of the other beam at the center line of the optical system at the film plane.

While optical prism arrangements of the prior art are available for obtaining a desired inward lateral shift of each image at the film plane, such prism arrangements are relatively expensive and the use thereof involves an extensive modification of the optical system of an existing recording unit.

In accordance with this invention, the desired double sound track is recorded with an existing recording optical system modified only by the addition of an image doubling optical element which may be mounted in the lens tube of an existing system. This optical element is so located with respect to the lens elements and recording film that each of the modulated light beams focused at the film by the lens element is doubled, so that, at the film plane, there are formed two images of each modulating device. The lateral shifting of the images is such that an edge of one of the images of one of the modulating devices is essentially adjacent to an edge of one of the images of the other modulating device at the center line of the sound recording optical system at the plane of the film. The second image of each of the modulating devices falls well away from the sound track position and, where necessary, is masked out at the film plane.

Specifically, the optical element added to the existing recording optical system is either a bi-plate or a bi-prism. By properly orienting either one of these optical units about the axis of the optical system and adjusting its position along this axis in the vicinity of or within the objective lens assembly, two separate images of each pair of light modulating ribbons are produced at the film plane. One of the two images of each pair of ribbons occupies a separate half of the sound track area laterally of the film. The other image of each pair of ribbons produced by the optical element falls well out of the sound track area and is masked from the film by appropriate means.

The bi-prism employed in this invention consists of two prisms joined base to base. As employed in this invention, the bi-prism is made from one piece of glass with one side flat, so that, in section, it is a relatively flat isosceles triangle.

The bi-plate which may be employed in this invention is made of two parallel-sided glass plates cemented together. These plates are inclined at equal and opposite angles with reference to the cemented surface as a plane of symmetry.

The bi-prism and the bi-plate each accomplishes the result desired. The bi-prism is preferred where only limited space is available for mounting this additional optical unit in an existing optical system. The bi-plate and the bi-prism both double the image formed by the recording objective lens and, in each case, the two images are displaced by equal amounts and in opposite directions from the position the original image would be located at the film plane in the absence of the bi-plate or bi-prism.

The invention may be more clearly understood by reference to the specification when read in connection with the accompanying drawings in which:

Fig. 1 is a plan view showing the image separation at the film plane when a standard recording optical system is used with a two-channel variable area sound track recording light valve;

Fig. 2 is a front elevation of the recording film of Fig. 1 showing the lateral separation of the images with respect to the film sound track area;

Fig. 3 is a plan view of the optical system of Fig. 1 incorporating a bi-prism producing doubling of the image in accordance with this invention;

Fig. 4 is a front elevation of the film shown in Fig. 3 showing the location of one image of each aperture within the sound track area;

Fig. 5 is an enlarged view of the bi-prism used in the optical system of Fig. 3;

Fig. 6 is an enlarged view of a bi-plate which may be substituted in the optical system for the bi-prism of Fig. 5; and Fig. 7 is a view showing the ribbon and mask arrangement of the light valve together with the electrical connections from the sources of sound to the light valve ribbons.

Referring to Fig. 1, a light source 1 projects a light beam toward a light valve 2. Light valve 2 is provided with current responsive ribbons 3, 4, 5 and 6 and a mask 7. For the sake of simplicity in the drawings, the usual condenser lens system employed to focus the light beam at the light valve ribbons and the magnet structure for the light valve are not shown. As shown in Fig. 7, the mask 7 is provided with a laterally elongated aperture 8 located in front of ribbons 3 and 4 and a similar aperture 9 located in front of ribbons 5 and 6. The ribbons 3 and 4 move toward and away from each other in response to signal and bias current received from a source 10. This movement of ribbons 3 and 4 in the light beam produces a bi-lateral variable area sound track on a recording film F. Similarly, ribbons 5 and 6 move toward and away from each other in response to a different source of signal and bias current 11 to modulate the light beam in a manner to produce a separate bi-lateral variable area sound track on the recording film F.

A lens tube 12 contains an objective lens 13 which produces at the plane of film F an image 14 of the ribbons 3 and 4 and an image 15 of the ribbons 5 and 6. The objective lens assembly mounted in tube 12 may include two lenses. Referring to Fig. 2, it will be seen that the separation of the images 14 and 15 laterally of the film is such that they both fall outside the lateral film space 16 assigned to the sound track between the marginal row of sprocket perforations 17 and the picture area 18.

In accordance with this invention, an image of each of the light modulating apertures formed by the separate pair of ribbons is brought within the sound track area 16 on film F by a novel and inexpensive modification of the existing optical system of Fig. 1. In the modification in accordance with this invention, a bi-prism 20 is mounted in the lens tube 12 preferably between the two lens elements of a double lens objective assembly. As indicated in the drawings, the bi-prism 20 doubles each image formed by the objective lens 13 and, in each case, the two images are displaced by equal amounts and in opposite directions from the position occupied by the original image at the film plane. In Fig. 3, the image 14 of the ribbons 3 and 4 is doubled by the bi-prism 20, as indicated by the full line 21 and the dotted line 22. The image 14a produced along light beam 21 is shifted into the sound track area 16, while the other image formed along line 22 is shifted the same distance in the opposite direction where it would image at the film plane in the picture area 18 if it were not masked out by a mask 24.

The image 15 of the ribbons 5 and 6 is doubled. One of these images 15a, as formed along light beam 25, is displaced laterally of the film to bring it within the film track area 16 alongside the image 14a. The light beam 26, which, in the system shown in the drawings would image at the film plane, is displaced laterally by an amount sufficient to cause it to pass the edge of the film F.

As shown in Fig. 4, one image 14a of the pair of ribbons 3 and 4 is located alongside one image 15a of the pair of ribbons 5 and 6 and the second image of each pair of ribbons is either prevented from reaching the film by a suitable mask or falls outside the film area.

Fig. 5 shows an enlarged view of the bi-prism 20 used in the optical system of Fig. 2. This unit is in effect two prisms joined base to base at the line 28 but, because of the fact that one of the base angles of each prism is a right angle, the optical unit may be and is made from a single piece of glass with one side flat. The sides 29 and 30 of the bi-prism 20 if extended, would meet the base side 31 in a small angle of the order of one or two degrees.

A bi-plate 32, as shown in Fig. 6, is made of two parallel-sided plates of glass 33 and 34 cemented together at 35. These plates are each inclined at equal and opposite angles with reference to the cemented surface 35.

The two images formed by either the bi-prism 20 or the bi-plate 32 are displaced from the position of the original image by equal amounts but in opposite directions. An inclined plate as used in the bi-plate 32 in Fig. 6 displaces an image by moving the light rays bodily sideways. Each light ray emerges parallel to its original direction but with a lateral shift. By contrast, a light ray emerging from a prism of the bi-prism 20 is not parallel to its original direction, as is clearly shown in Fig. 3.

The novel recording system in accordance with this invention provides a compact and inexpensive means for recording a pair of stereophonically related sound tracks in the sound track area used normally for a single sound track so that the sound picture film may be reproduced in a theatre equipped for stereophonic reproduction or in a theatre not so equipped without modification of the reproducing equipment in the theatre equipped only for single track reproduction.

What is claimed is:

1. The combination in a system for photographically recording a pair of sound tracks in a predetermined area laterally of a light sensitive film, of a source of light, means forming a pair of laterally offset light beams, means for modulating each of said light beams in accordance with sounds to be recorded, lens means imaging each of said modulating means at the plane of said film in laterally offset relation, optical means disposed on the optical axis of said imaging lens means producing a doubling of each of said images at the film plane, and means disposed between said optical means and said film for masking from said film those images falling outside said predetermined area laterally of said film.

2. The combination in a system for photographically recording a pair of sound tracks on a light sensitive film, of a source of light, means forming a pair of laterally offset light beams, means for modulating each of said light beams in accordance with sounds to be recorded, lens means imaging each of said modulating means at the plane of said film, and optical means disposed in the optical axis of said imaging lens means for doubling each of said images, said image doubling optical means being positioned along the optical axis of said lens system to produce such lateral displacement of the two images of each said modulating means that one of the images of each double image is located at said film in the area between the positions the corresponding single images would be formed by said lens means at the film plane in the absence of said optical means.

3. The combination in accordance with claim 2 in which means are provided to mask from said film one image of each pair of images of the modulating means.

4. In a system for recording two sound tracks within a predetermined space laterally of a recording film, the combination of means producing a pair of light beams offset laterally with respect to said film, means for modulating each of said light beams in accordance with sounds to be recorded, lens means common to said pair of light beams for producing an image of each of said modulating means at said film, and optical means producing a doubling of each of said images at the plane of said film, said image doubling optical means being positioned along the optical axis of said imaging lens means to produce such displacement of said images laterally of said film that one image of one of said modulating means is adjacent to one image of the other of said modulating means within said predetermined space laterally of said recording film.

5. A system in accordance with claim 4 in which means are provided for masking from said recording film the second image of each of said modulating devices.

6. In a system for recording a plurality of sound tracks within a predetermined space laterally of a recording film, the combination of means forming a plurality of light beams offset laterally with respect to said film, a sound current responsive light modulating device individual to each of said light beams, an optical system common to said light beams, said optical system including a lens element normally producing an image of each of said modulating devices at said film plane in laterally offset relation, and an optical element in the form of a bi-prism disposed in said optical system for producing a doubling of each image at the film plane said bi-prism being positioned along the optical axis of said optical system to produce such lateral displacement of the two images of each modulating device away from each other that one image of one of said modulating devices has one edge adjacent to one edge of one image of the other of said modulating devices at the center of the predetermined lateral sound track area of said film.

7. A system in accordance with claim 6 in which masking means are provided in the path of each light beam forming the second image of each of said modulating devices.

References Cited in the file of this patent
UNITED STATES PATENTS 2,161,369   McLeod _____ June 6, 1939